US012645904B2

(12) United States Patent
Ohta et al.

(10) Patent No.: US 12,645,904 B2
(45) Date of Patent: Jun. 2, 2026

(54) IMAGE FORMING APPARATUS FOR CONTROLLING DENSITY OF IMAGE TO BE FORMED AND DETECTED, CONTROLLER FOR WHETHER FIRST AND SECOND CALIBRATIONS ARE EXECUTED BASED ON PREDICTED DESNSITY AND ENVIRONMENT CONDITION

(71) Applicant: CANON KABUSHIKI KAISHA, Tokyo (JP)

(72) Inventors: Yuya Ohta, Chiba (JP); Hiromi Shimura, Ibaraki (JP); Koji Yumoto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 18/436,406

(22) Filed: Feb. 8, 2024

(65) Prior Publication Data

US 2024/0273324 A1     Aug. 15, 2024

(30) Foreign Application Priority Data

Feb. 14, 2023     (JP) ................................. 2023-020972

(51) Int. Cl.
*G06K 15/02* (2006.01)
*G06K 15/14* (2006.01)
*G06V 30/19* (2022.01)

(52) U.S. Cl.
CPC ........... *G06K 15/027* (2013.01); *G06K 15/14* (2013.01); *G06V 30/1906* (2022.01)

(58) Field of Classification Search
USPC ................................................... 358/1.14, 1.9
See application file for complete search history.

(56) References Cited

U.S. PATENT DOCUMENTS

| | | | |
|---|---|---|---|
| 6,418,281 B1 | 7/2002 | Ohki | |
| 8,988,728 B2 * | 3/2015 | Nakase | G03G 15/5041 |
| | | | 358/1.9 |
| 2008/0088883 A1 * | 4/2008 | Yoshida | H04N 1/00901 |
| | | | 358/300 |

(Continued)

FOREIGN PATENT DOCUMENTS

| | | |
|---|---|---|
| JP | 2000238341 A | 9/2000 |
| JP | 2019074574 A | 5/2019 |

*Primary Examiner* — Haris Sabah
(74) *Attorney, Agent, or Firm* — ROSSI, KIMMS & McDOWELL LLP

(57) ABSTRACT

An image forming apparatus includes: an image forming unit configured to form an image on a sheet based on an image forming condition; an image carrier; a sensor configured to measure a measurement image on the image carrier; a prediction unit configured to predict a density of an image to be formed; a detector configured to detect an environmental condition; and a controller. The controller is configured to: control whether to execute first calibration, in which the measurement image is not formed and the image forming condition is controlled based on the density predicted by the prediction unit, based on the environmental condition detected by the detector; and execute second calibration, in which the image forming condition is controlled based on a measurement result of the measurement image measured by the sensor.

12 Claims, 9 Drawing Sheets

(56)                    References Cited

U.S. PATENT DOCUMENTS

| 2011/0026953 | A1* | 2/2011 | Tomita | ............... | G03G 15/161 |
| | | | | | 399/49 |
| 2014/0140713 | A1* | 5/2014 | Miyaji | ............... | G03G 21/206 |
| | | | | | 399/92 |
| 2014/0176970 | A1* | 6/2014 | Iguchi | ............... | H04N 1/6033 |
| | | | | | 358/1.9 |

* cited by examiner

102 MACHINE LEARNING SERVER

105 DATA SERVER

103 GENERAL-PURPOSE COMPUTER

104

IMAGE FORMING APPARATUS

100

F I G. 2
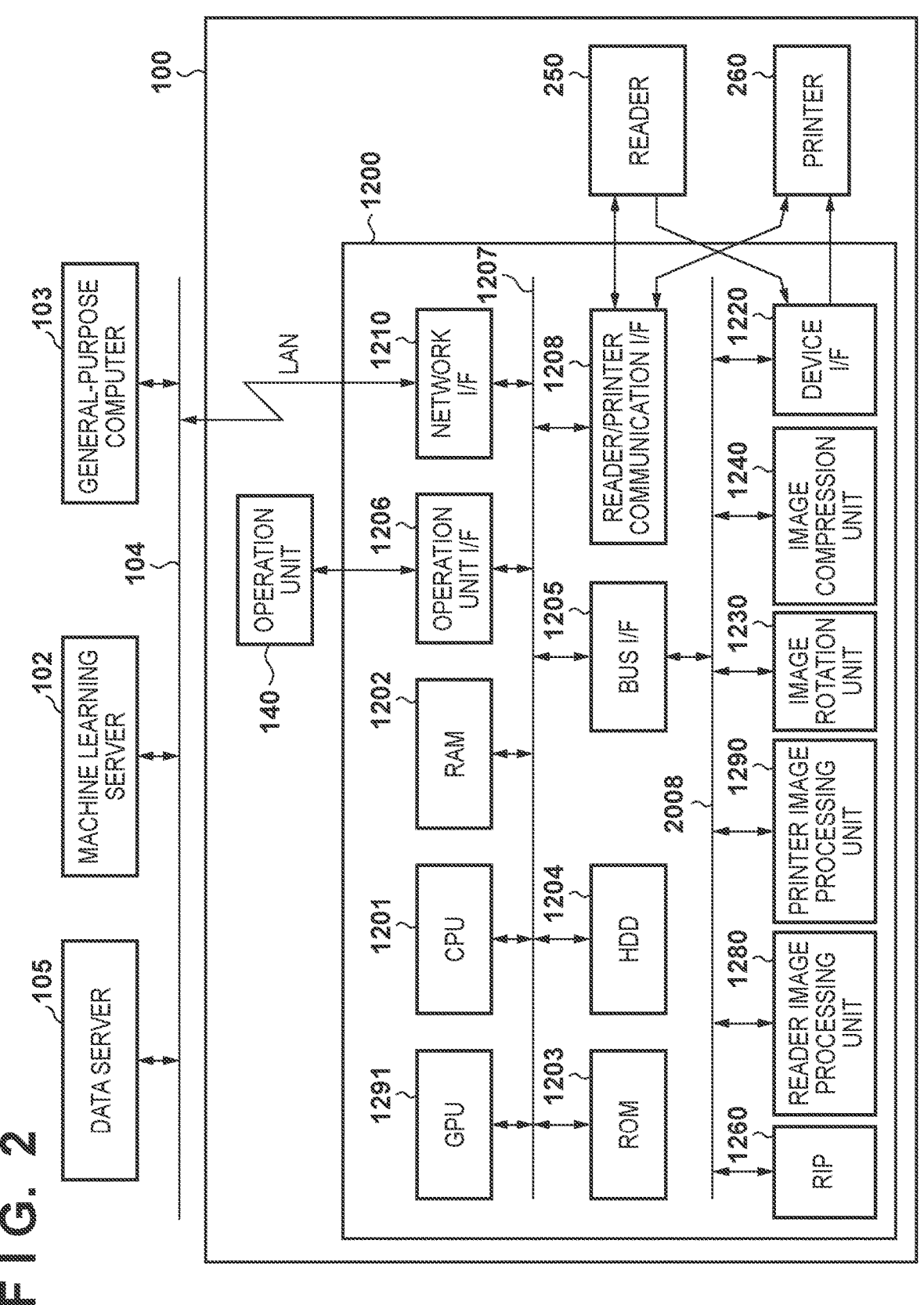

F I G. 3
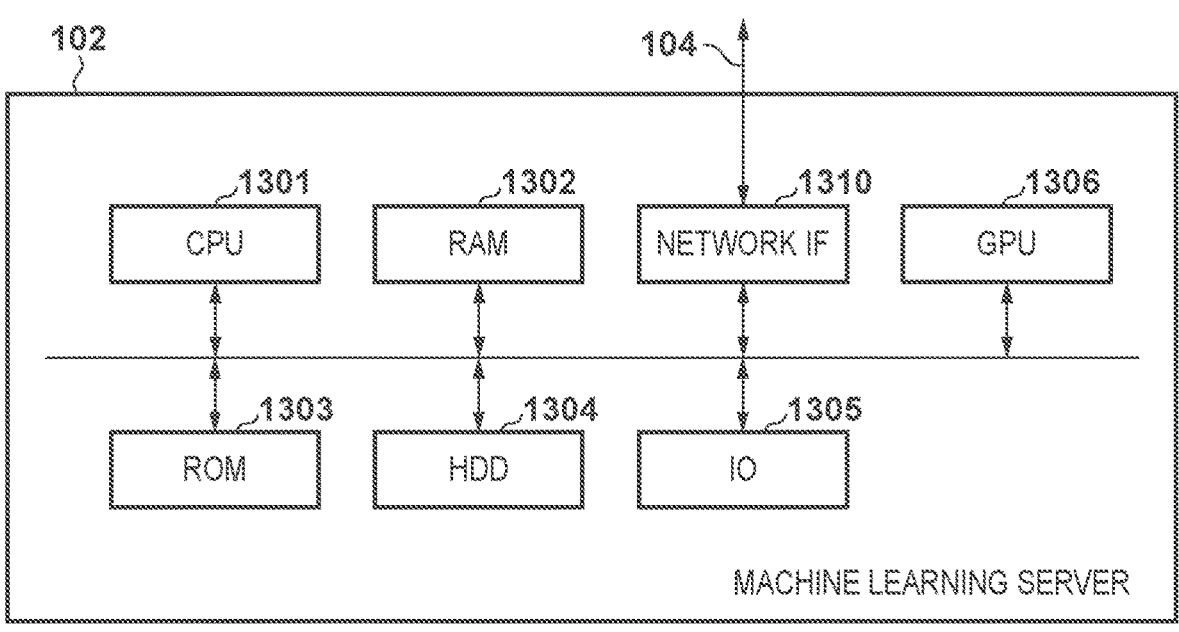

F I G. 7A
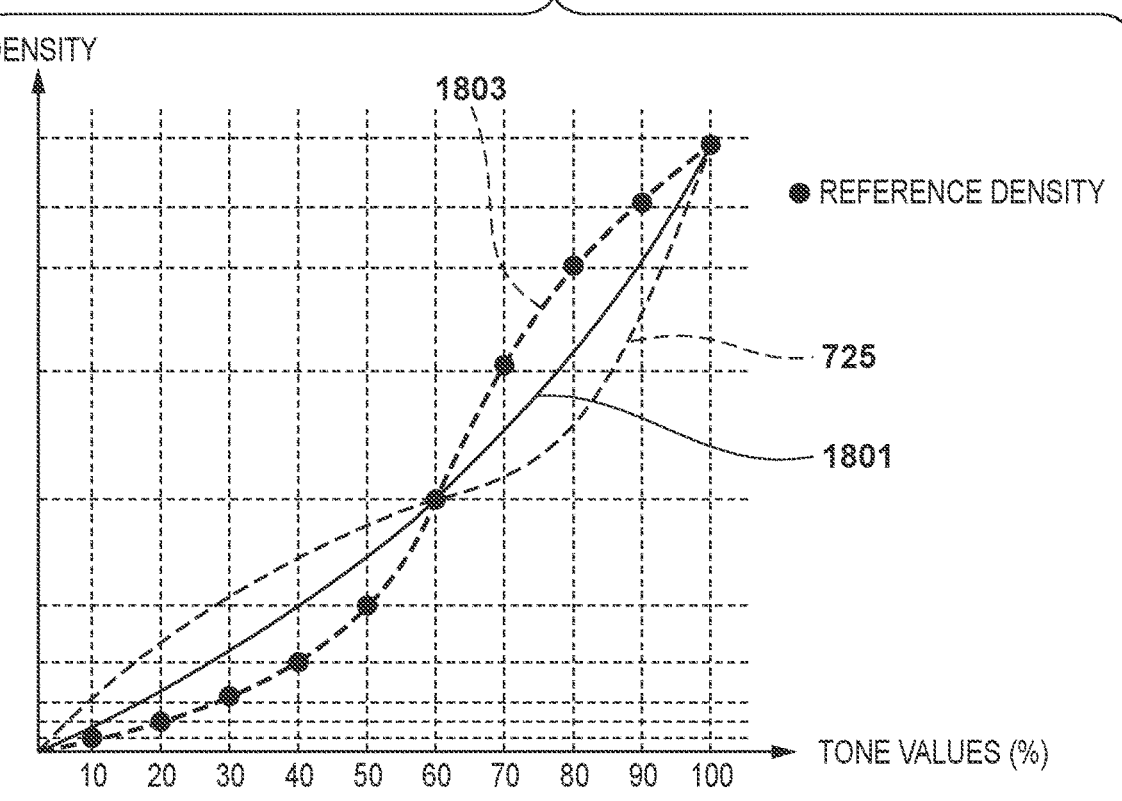
F I G. 7B
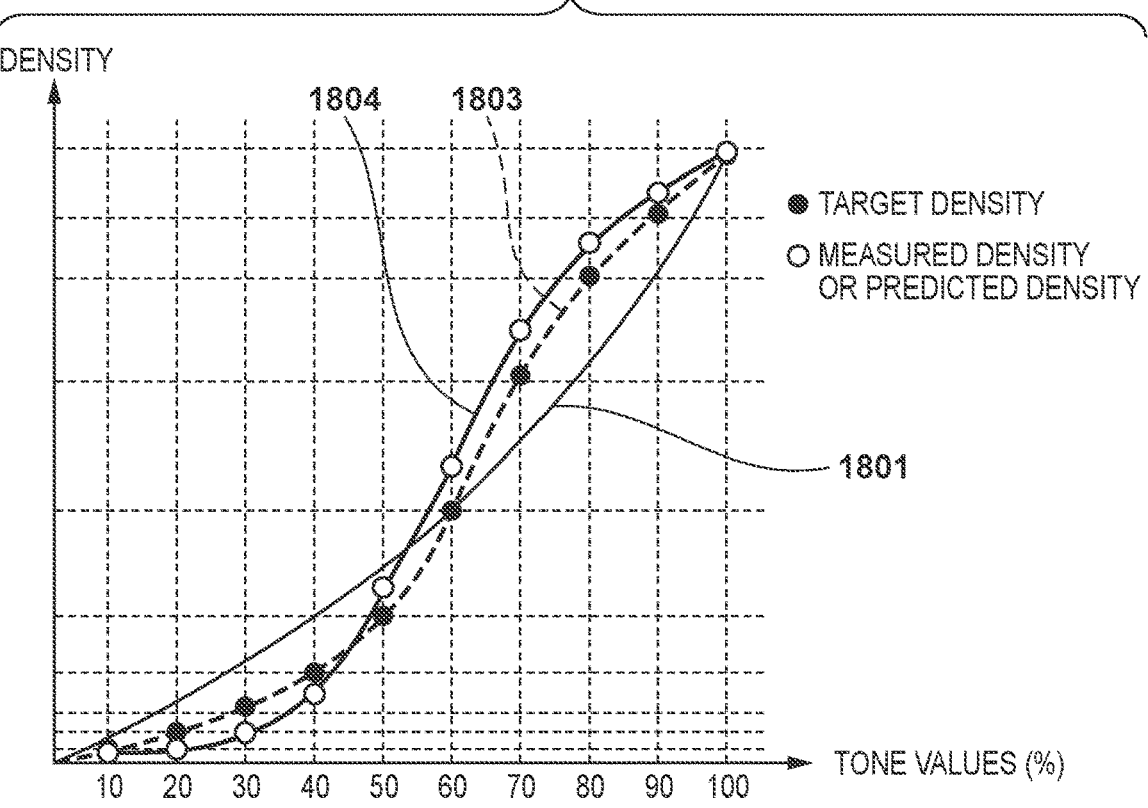

F I G. 8
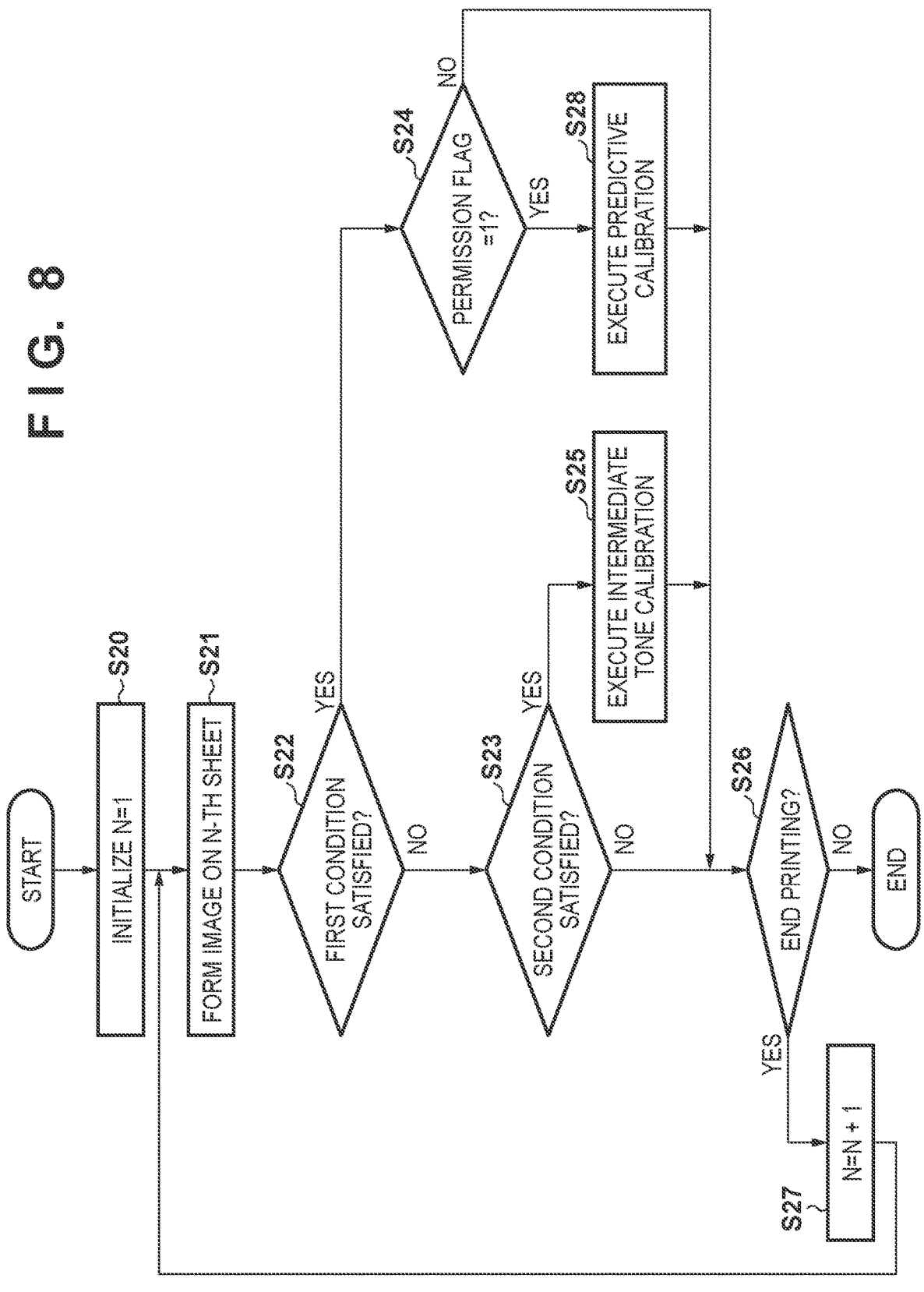

F I G. 9
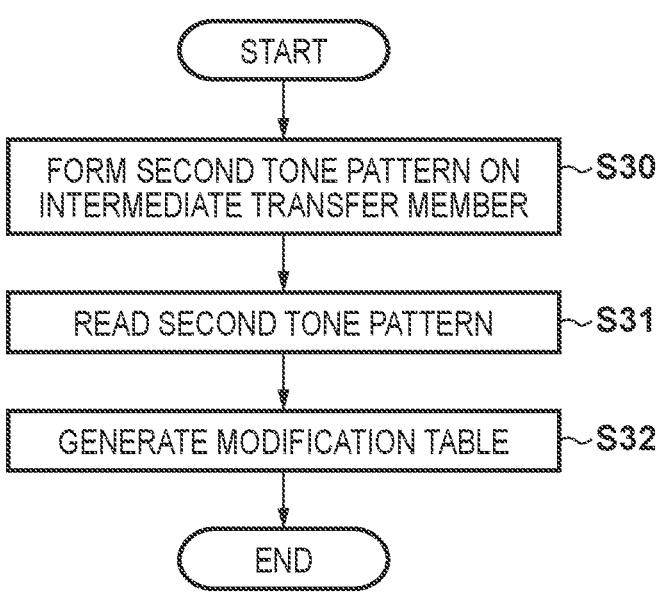
START
FORM SECOND TONE PATTERN ON
INTERMEDIATE TRANSFER MEMBER — S30
READ SECOND TONE PATTERN — S31
GENERATE MODIFICATION TABLE — S32
END
F I G. 10
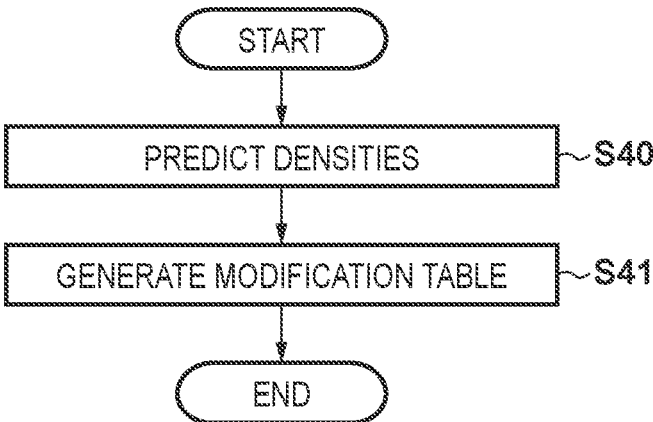
START
PREDICT DENSITIES — S40
GENERATE MODIFICATION TABLE — S41
END

IMAGE FORMING APPARATUS FOR CONTROLLING DENSITY OF IMAGE TO BE FORMED AND DETECTED, CONTROLLER FOR WHETHER FIRST AND SECOND CALIBRATIONS ARE EXECUTED BASED ON PREDICTED DESNSITY AND ENVIRONMENT CONDITION

BACKGROUND OF THE INVENTION

Field of the Invention

The present invention relates to a calibration technique in an image forming apparatus.

Description of the Related Art

A density of an image (output image) formed by an image forming apparatus changes depending on an environmental change or temporal change. In order to reduce the change in density of the output image, the image forming apparatus executes calibration. U.S. Pat. No. 6,418,281 discloses a configuration in which an image forming apparatus performs calibration by reading a tone pattern formed on a sheet (printing material). Japanese Patent Laid-Open No. 2019-074574 discloses a configuration in which a density of an output image is predicted based on the values of various parameters and calibration is performed.

In the configuration of Japanese Patent Laid-Open No. 2019-074574, since there is no need to form a tone pattern for calibration, there is no downtime caused by calibration. Hereinafter, calibration that is performed by predicting density without forming a tone pattern as disclosed by Japanese Patent Laid-Open No. 2019-074574 is referred to as "predictive calibration".

In predictive calibration, a prediction model is generated based on a relationship between various values of a plurality of parameters and a density of an output image, and the density of the output image is predicted by using the values of the plurality of parameters as input of the prediction model. Here, when the values of the parameters to be inputted to the prediction model differ significantly from the plurality of values of the parameters used to generate the prediction model, the prediction accuracy may decrease. The decrease in prediction accuracy leads to a decrease in calibration accuracy.

SUMMARY OF THE INVENTION

According to an aspect of the present invention, an image forming apparatus includes: an image forming unit configured to form an image on a sheet based on an image forming condition; an image carrier; a sensor configured to measure a measurement image on the image carrier formed by the image forming unit; a prediction unit configured to predict a density of an image to be formed by the image forming unit; a detector configured to detect an environmental condition; and a controller. The controller is configured to: control whether to execute first calibration, in which the measurement image is not formed and the image forming condition is controlled based on the density predicted by the prediction unit, based on the environmental condition detected by the detector; and execute second calibration, in which the image forming condition is controlled based on a measurement result of the measurement image measured by the sensor.

Further features of the present invention will become apparent from the following description of exemplary embodiments (with reference to the attached drawings).

BRIEF DESCRIPTION OF THE DRAWINGS

FIG. 2 is a hardware configuration diagram of an image forming apparatus according to an embodiment.

FIG. 3 is a hardware configuration diagram of a machine learning server according to an embodiment.

FIG. 7A is a diagram for explaining a method of generating a base table according to an embodiment.

FIG. 7B is a diagram for explaining a method of generating a modification table according to an embodiment.

FIG. 8 is a flowchart of print processing according to an embodiment.

FIG. 9 is a flowchart for intermediate tone calibration according to an embodiment.

FIG. 10 is a flowchart for predictive calibration according to an embodiment.

DESCRIPTION OF THE EMBODIMENTS

Figure 1:
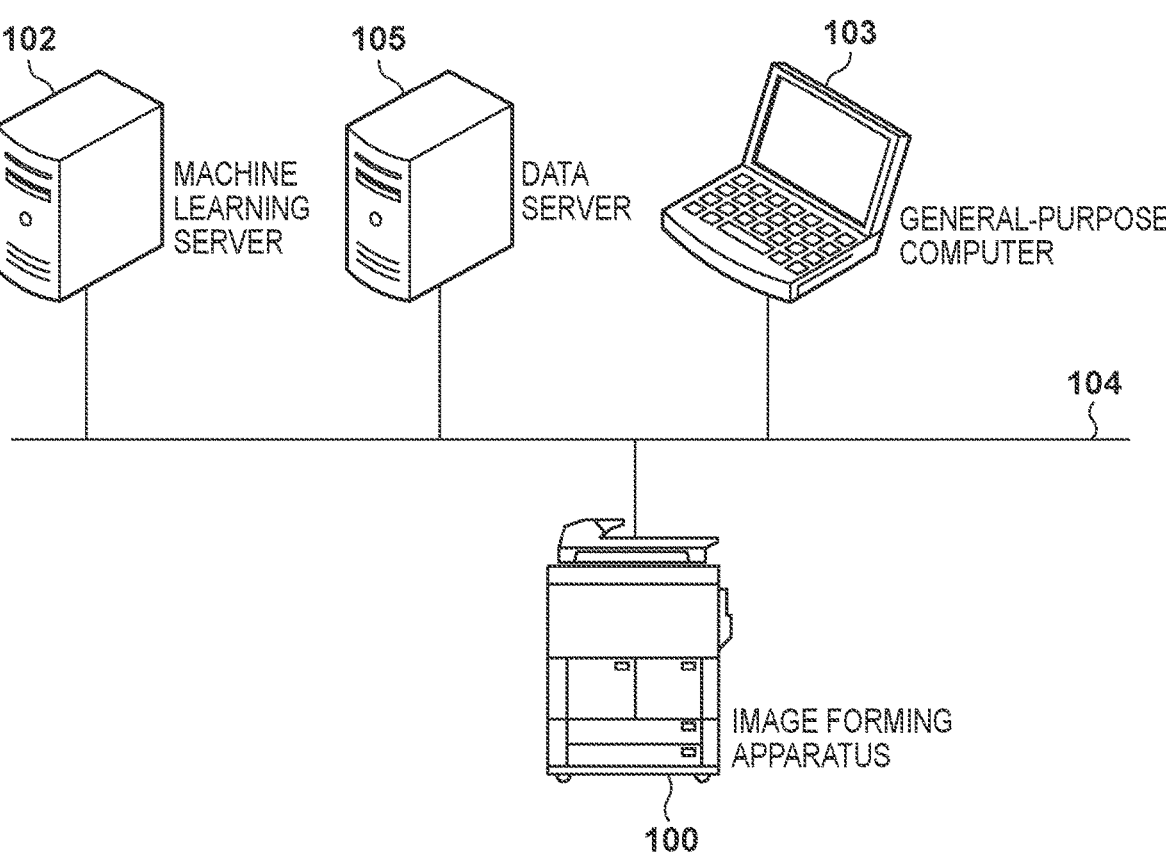
FIG. 1 is a block diagram of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 illustrates an image forming system used for description of an embodiment. An image forming apparatus 100, a machine learning server 102, a general-purpose computer 103, and a data server 105 are configured to be able to communicate with each other through a network 104. The image forming apparatus 100 is, for example, a printer, a multifunction peripheral, a fax machine, or the like. The general-purpose computer 103 transmits a print job to the image forming apparatus 100 to cause the image forming apparatus 100 to form an image.

The data server 105 collects and stores training data used for machine learning in the machine learning server 102 from the image forming apparatus 100 or the like. The machine learning server 102 performs machine learning based on the training data stored in the data server 105 to generate a learning model (prediction model). For example, a learning model can be generated for each color that the image forming apparatus 100 uses for image formation. Instead of separating the machine learning server 102 from the data server 105, a configuration in which the same computer is provided with a training data collection function and a machine learning-based learning model generation function may be taken. The image forming apparatus 100 performs predictive calibration using the learning model generated by the machine learning server 102.

The installation locations of the data server 105 and the machine learning server 102 may be the same as or different from that of the image forming apparatus 100. In addition, the training data collected by the data server 105 is not limited only to those collected from the image forming apparatus 100 that uses the learning model based on that training data. For example, training data collected from a different image forming apparatus of the same type as the image forming apparatus 100 can be used for generation of a learning model to be used by the image forming apparatus 100.

FIG. 2 is a hardware configuration diagram of the image forming apparatus 100. An operation unit 140 provides an input/output interface to a user of the image forming apparatus 100. A reader 250 reads a document and outputs image data according to a user operation through the operation unit 140. A printer 260 forms an image on a sheet. The image data of an image to be formed on a sheet by the printer 260 is image data from the reader 250 or image data received from the general-purpose computer 103. A controller 1200 controls the entire image forming apparatus 100.

A configuration of the controller 1200 will be described below. First, devices connected to a system bus 1207 will be described. A network interface (IF) 1210 is an interface with the network 104. An operation unit IF 1206 is an interface with the operation unit 140. A CPU 1201 comprehensively controls the image forming apparatus 100. A RAM 1202 functions as a working memory of the CPU 1201. A ROM 1203 stores a boot program to be executed by the CPU 1201. A hard disk drive (HDD) 1204 stores system software and the like. The HDD 1204 can also be used to store image data. A reader/printer communication IF 1208 is an interface between devices connected to the system bus 1207 and the reader 250 and the printer 260. A GPU 1291 performs prediction processing using, for example, a learning model. A bus IF 1205 connects the system bus 1207 and an image bus 2008.

Next, devices connected to the image bus 2008 will be described. A raster image processor (RIP) 1260 expands PDL code included in a print job received from the general-purpose computer 103 into a bitmap image. A reader image processing unit 1280 performs various kinds of image processing on image data from the reader 250. A printer image processing unit 1290 performs various kinds of image processing, such as resolution conversion, to generate image data to be outputted to the printer 260. An image rotation unit 1230 performs processing for rotating an image. An image compression unit 1240 performs processing for compressing/decompressing JPEG and the like. A device IF 1220 is an interface between devices connected to the image bus 2008 and the reader 250 and the printer 260.

FIG. 3 is a hardware configuration diagram of the machine learning server 102. A CPU 1301 controls the entire machine learning server 102. A RAM 1302 functions as a system working memory of the CPU 1301. A ROM 1303 stores Basic Input Output System (BIOS), a program for starting an OS, setting files, and the like. An HDD 1304 stores system software and the like. A network IF 1310 is an interface with the network 104. An IO 1305 provides an input/output interface. A GPU 1306 performs machine learning based on training data to generate a learning model. Although not illustrated, a hardware configuration of the data server 105 is similar to the configuration of the machine learning server 102.

Figure 4:
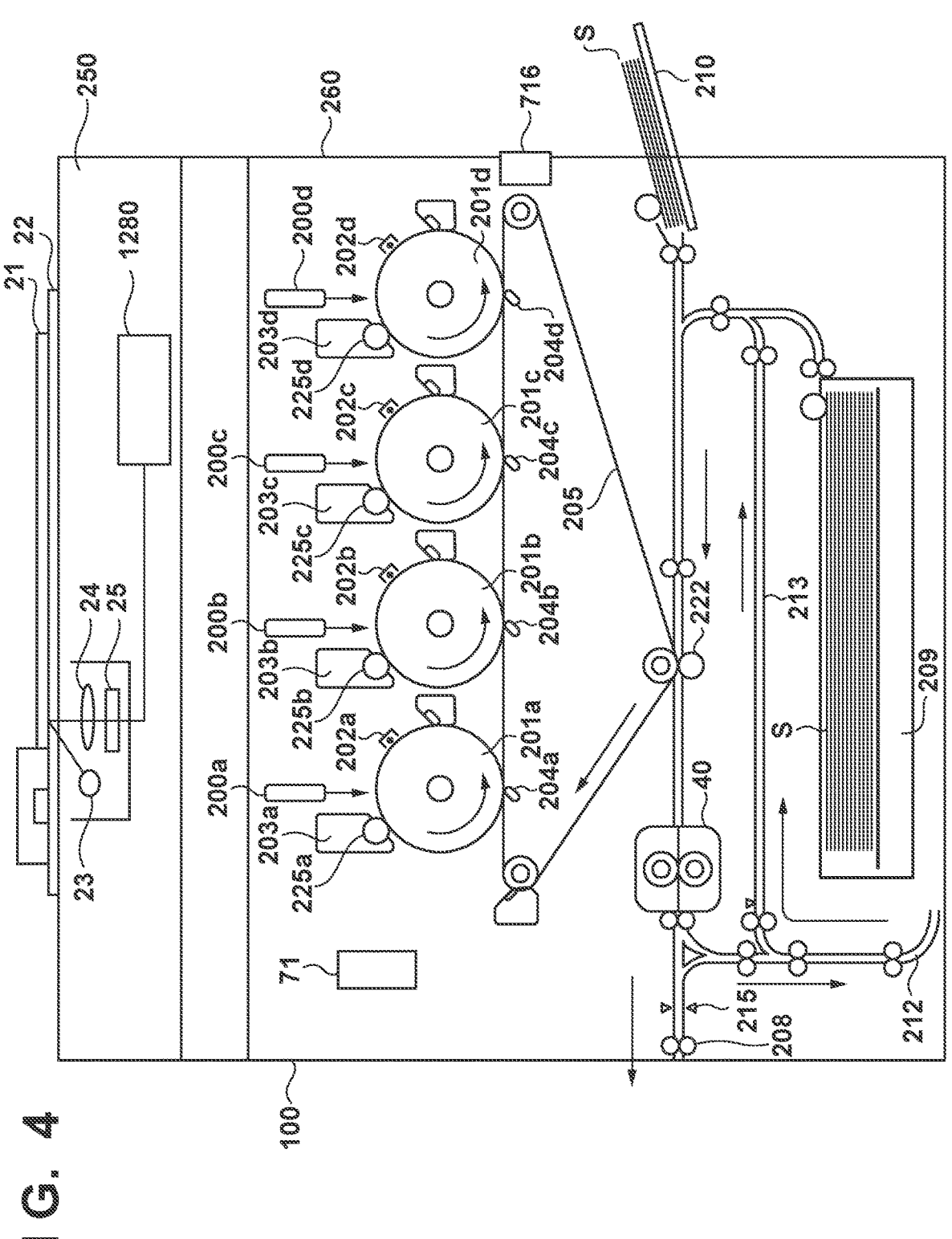
FIG. 4 is a cross-sectional view of the image forming apparatus according to an embodiment.

FIG. 4 is a schematic cross-sectional view of the printer 260 and the reader 250 of the image forming apparatus 100. First, the printer 260 will be described. In FIG. 4, letters, a, b, c, and d, are appended to the ends of reference numerals of members in which colors of an image related to formation are yellow, cyan, magenta, and black. In the following description, when it is not necessary to distinguish the colors of an image related to formation, description will be given using reference numerals from which trailing letters have been omitted. During image formation, a photosensitive body 201 is rotationally driven in a counterclockwise direction in the drawing. A charger 202 charges the surface of the photosensitive body 201 by outputting a charging voltage. A scanner 200 exposes the charged photosensitive body 201 based on image data to form an electrostatic latent image on the photosensitive body 201. A developing device 203 includes a developing roller 225 and toner and develops the electrostatic latent image using toner by outputting a developing voltage and thus forms a toner-based image (toner image) on the photosensitive body 201. A transfer blade 204 transfers the toner image of the photosensitive body 201 to an intermediate transfer body 205 by outputting a primary transfer voltage. By transfer of the image of each photosensitive body 201 onto the intermediate transfer body 205 in a superimposed manner, colors different from yellow, cyan, magenta, and black can be reproduced. The intermediate transfer body 205 functions as an image carrier that carries an image.

During image formation, the intermediate transfer body 205 is rotationally driven in a clockwise direction in the drawing. Therefore, the images transferred to the intermediate transfer body 205 are conveyed to a position facing a secondary transfer roller 222. The secondary transfer roller 222 transfers the images of the intermediate transfer body 205 to a sheet S, which has been conveyed along a conveyance path from a cassette 209 or a manual feed tray 210, by outputting a secondary transfer voltage. A fixing device 40 fixes the images to the sheet S by pressing and heating the sheet to which the images have been transferred. During duplex printing, the sheet S that passed through the fixing device 40 is transported to the position facing the secondary transfer roller 222 again through a duplex reversing path 212 and a duplex path 213. Finally, the sheet S on which an image has been formed is discharged to the outside of the image forming apparatus 100 by a discharging roller 208. An inline sensor 215 detects a density of the image formed on the sheet S on an upstream side of the discharging roller 208. A density sensor 716 detects a density of images transferred to the intermediate transfer body 205. The density sensor 716 is an optical sensor that includes, for example, a light emitting element and a light receiving element and measures light reflected off of the intermediate transfer body 205 or toner images transferred thereon. An environment sensor 71 detects environmental information (environmental conditions), such as temperature and humidity.

Next, the reader 250 will be described. A light source 23 emits light onto a document 21 placed on a document platen glass 22. An optical system 24 forms an image of light reflected off of the document 21 on a CCD sensor 25. The CCD sensor 25 generates image data of the document 21 based on the light reflected off of the document 21 and outputs the image data to the reader image processing unit 1280 of the controller 1200.

Figure 5:
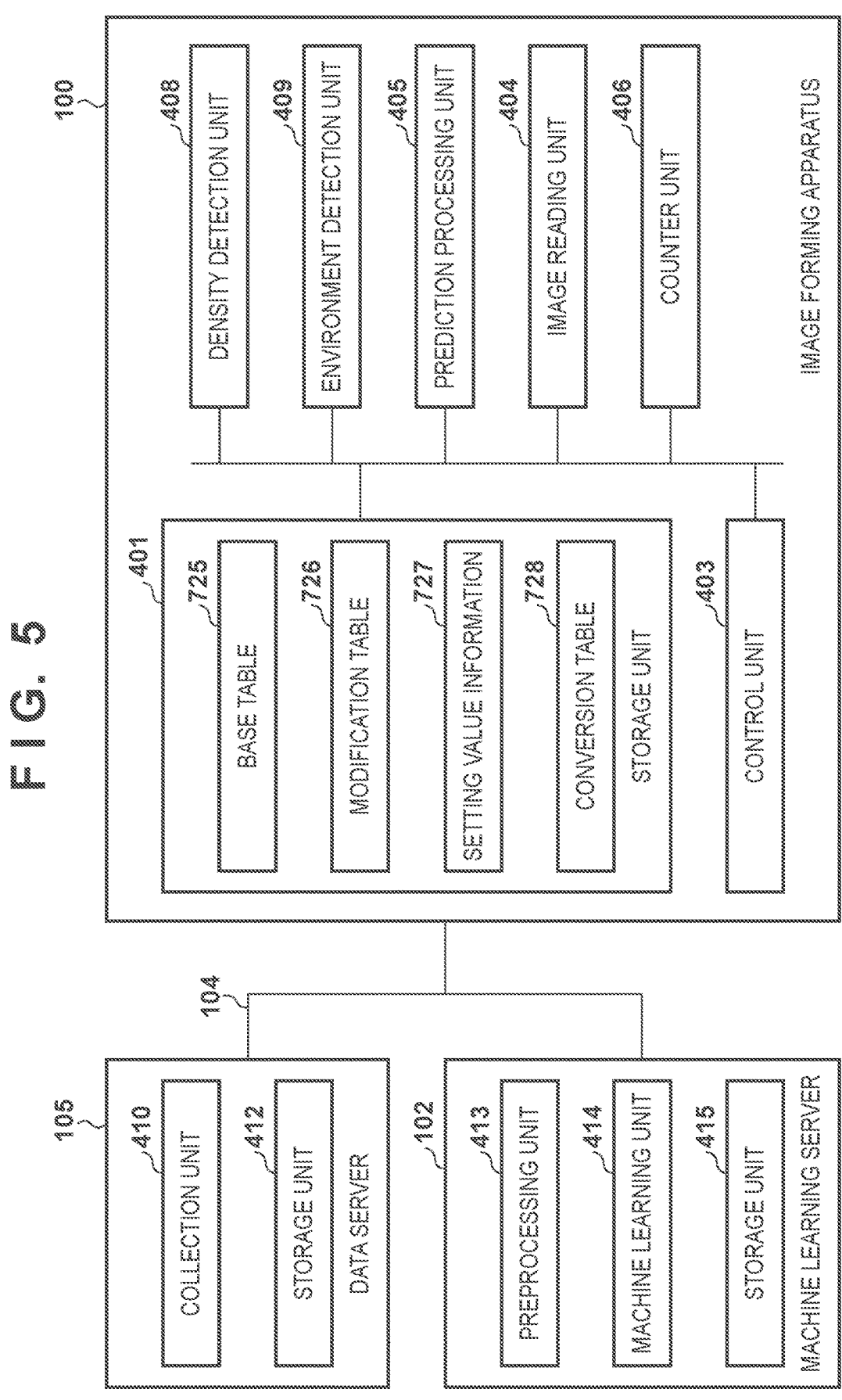
FIG. 5 is a functional block diagram of the image forming system according to an embodiment.

FIG. 5 is a functional block diagram of the image forming system illustrated in FIG. 1. The functional blocks illustrated in FIG. 5 can be realized by processors, such as CPUs, executing appropriate programs in the respective apparatuses.

A collection unit 410 of the data server 105 collects training data from the image forming apparatus 100 and the like and stores the training data in a storage unit 412. A preprocessing unit 413 of the machine learning server 102 performs preprocessing on the training data stored in the storage unit 412 of the data server 105. The preprocessing may include, for example, processing for removing unwanted data, which are noise, from the training data. A machine learning unit 414 generates a learning model by performing machine learning based on the training data preprocessed by the preprocessing unit 413. The learning model of the present embodiment predicts a density of an image formed by the image forming apparatus 100 based on the values of various input parameters and is also referred to as a prediction model or prediction information. In the present embodiment, the GPU 1306 performs machine learning. However, a configuration in which the CPU 1301 alone performs machine learning may be taken, or a configuration in which the CPU 1301 and the GPU 1306 perform machine learning in cooperation may be taken. The machine learning unit 414 stores the generated learning model in a storage unit 415.

The learning model generated by the machine learning unit 414 may be a neural network. The neural network outputs a density of an output image, a density change amount with respect to a reference density, and the like based on various input parameters. As examples that do not limit the invention, the input parameters may include temperature, humidity, the temperature of the fixing device 40, the amount of toner replenishment, the amount of toner consumption, the total distance of rotation of the developing roller 225 of the developing device 203, the total distance of rotation of the photosensitive body 201, a standing time (which is time elapsed from completion of previous image formation), and the like. The total distance of rotation of the developing roller 225 is a product of the total number of rotations and the circumferential length of the developing roller 225. It is similar for the total distance of rotation of the photosensitive body 201. The present invention is not limited to prediction in which a neural network is used. For example, a configuration in which density is predicted using a nearest neighbor method, a naive Bayes method, a decision tree, a support vector machine, and the like may be taken.

Next, the functional blocks of the image forming apparatus 100 will be described. A control unit 403 controls the entire image forming apparatus 100. The control unit 403 functions as a controller. An image reading unit 404 controls reading of a document by the reader 250 or an operation for reading a sheet S by the inline sensor 215. A prediction processing unit 405 performs prediction processing based on the learning model. In the present embodiment, the GPU 1291 performs prediction processing. However, a configuration in which the CPU 1201 alone performs prediction processing may be taken, or a configuration in which in which the CPU 1201 and the GPU 1291 perform prediction processing in cooperation may be taken.

A density detection unit 408 controls the density sensor 716 to measure a density of an image formed on the intermediate transfer body 205. An environment detection unit 409 obtains environmental information (environmental conditions) including information indicating temperature, information indicating humidity, and the like from the environment sensor 71. A counter unit 406 counts, for example, the number of sheets S on which an image has been formed during image formation based on a print job. A storage unit 401 stores a base table 725, a modification table 726, setting value information 727, and a conversion table 728. The contents of the information/tables stored in the storage unit 401 will be described later.

<Calibration>

The control unit 403 performs calibration (density correction control) so that a density of an output image formed by the image forming apparatus will be a target density that accords with image data. Calibration is performed for each of the respective colors. In the present embodiment, the control unit 403 performs three types of calibration. Main calibration is calibration performed by formation of a tone pattern on a sheet S. The base table 725 (FIG. 5) of each of the respective colors is generated by main calibration and stored in the storage unit 401. Intermediate tone calibration is a calibration performed by formation of a tone pattern, which is a measurement image, on the intermediate transfer body 205 and detection of densities of the tone pattern by the density sensor 716. Predictive calibration is a calibration performed based on a value of density predicted by the prediction processing unit 405. The modification table 726 (FIG. 5) of each of the respective colors is generated by intermediate tone calibration or predictive calibration.

When the focus is on calibration accuracy, main calibration which is performed by forming a tone pattern on the sheet S is the highest, and intermediate tone calibration which is performed by forming a tone pattern not on a sheet S but on the intermediate transfer body 205 is next highest. Meanwhile, when the focus is on downtime, main calibration which is performed by forming a tone pattern on a sheet S takes the longest, and intermediate tone calibration which is performed by forming a tone pattern on the intermediate transfer body 205 takes the next longest.

<Main Calibration>

Figure 6:
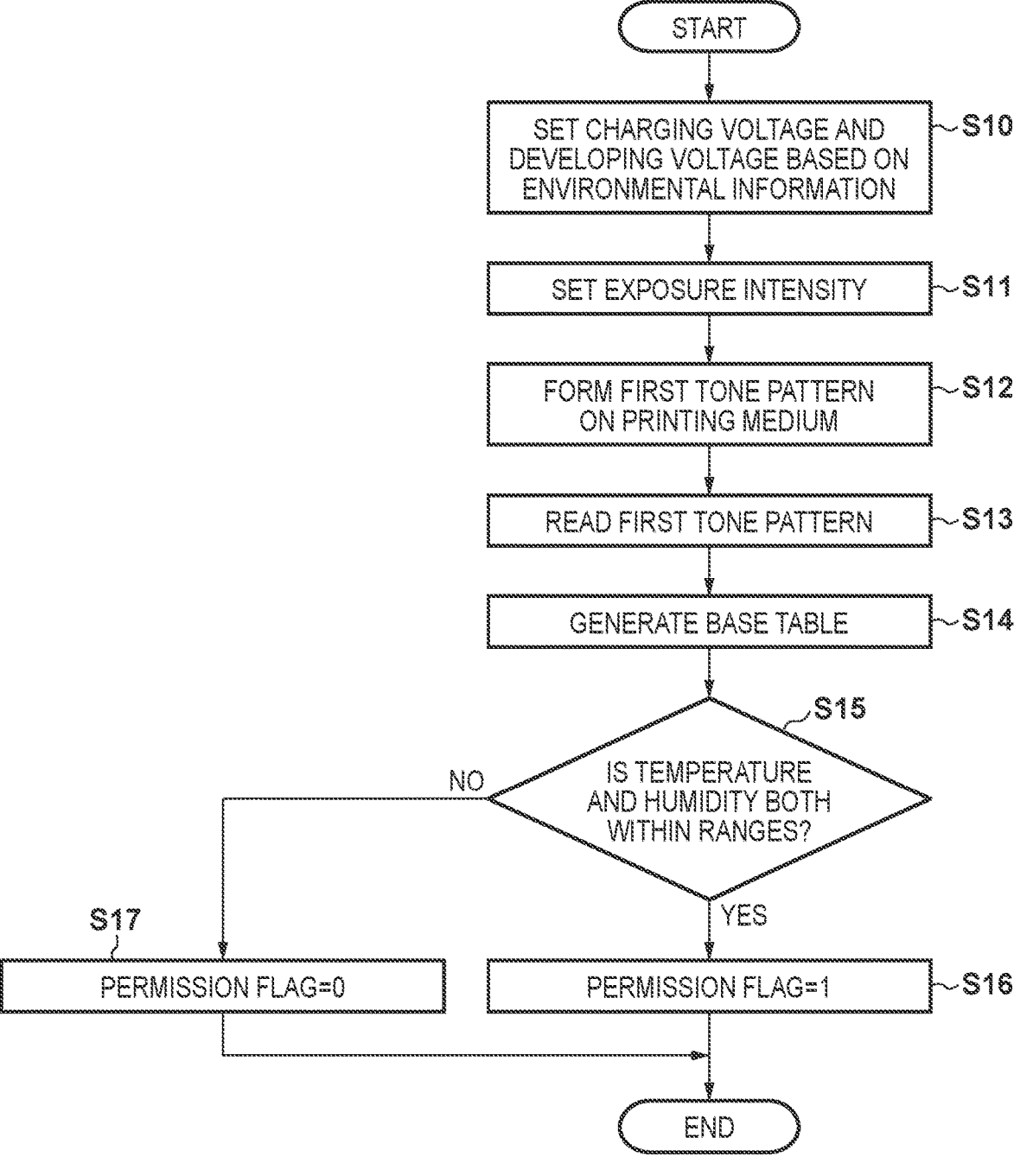
FIG. 6 is a flowchart for main calibration according to an embodiment.

FIG. 6 is a flowchart of main calibration. The main calibration may be started, for example, in response to the user instructing execution of main calibration through the operation unit 140 or through the general-purpose computer 103. In step S10, the control unit 403 obtains environmental information (environmental conditions) from the environment detection unit 409, determines the values of a charging voltage and a developing voltage (which are image forming conditions related to a maximum density) based on the environmental information (environmental conditions), and stores the values in the storage unit 401 as the setting value information 727. For example, the conversion table 728 (FIG. 5) illustrates a relationship between the values indicated by the environmental information (environmental conditions) and the values of the charging voltage and the developing voltage, and the control unit 403 determines the values of the charging voltage and the developing voltage by referencing the conversion table 728 based on the values of the environmental information (environmental conditions) obtained from the environment detection unit 409. The control unit 403 controls the charging voltage and the developing voltage to be at determined values.

In step S11, the control unit 403 determines an intensity of exposure of the photosensitive body 201 by the scanner 200. The exposure intensity is an image forming condition related to maximum density. Specifically, the control unit 403 sets the charging voltage and the developing voltage to the values determined in step S10 and forms a plurality of images on a sheet S using a plurality of exposure intensities. Next, the control unit 403 causes the reader 250 to read the sheet S, on which the plurality of images have been formed, through a user operation and determines the density of each of the plurality of images. The control unit 403 determines an exposure intensity for the maximum density to be at a target value based on the density of each of the plurality of images and stores the exposure intensity in the storage unit 401 as the setting value information 727. A configuration in which a density of an image formed on a sheet S is determined using the inline sensor 215 instead of the reader 250 may be taken.

In step S12, the control unit 403 forms a first tone pattern of each color on the sheet S. The first tone pattern includes images of a plurality of densities formed by a plurality of different tone values. As an example, the first tone pattern includes 64 images of different densities formed by 64 different tone values. In step S13, the control unit 403 causes the reader 250 to read the first tone pattern formed on a sheet S through a user operation and thus determines the density of each of the plurality of images of the first tone pattern. In step S14, the control unit 403 generates the base table 725 based on the density determined for each of the plurality of images of the first tone pattern and a target density for each of the plurality of images and stores the base table 725 in the storage unit 401. The base table 725 is a table for converting the tone value indicated by the image data.

FIG. 7A is a diagram for explaining a method of creating the base table 725 of one color. The horizontal axis of FIG. 7A indicates the tone value as percentage of the maximum value. Black circles of FIG. 7A indicate the densities determined in step S13 for the tone values used to form the respective images of the first tone pattern. Hereinafter, the density of a black circle illustrated in FIG. 7A will be expressed as reference density at that tone value. A reference numeral 1803 of FIG. 7A is a reference density characteristic of the image forming apparatus 100 that is determined from the tone values used for forming the first tone pattern and the densities determined in step S13. Further, a reference numeral 1801 is a target characteristic indicating a relationship between a tone value and a target density. The base table 725 is created by inverting (inversely converting) the reference density characteristic 1803 with respect to the target characteristic 1801. The base table 725 is density control information for bringing a density of an output image closer to a target density. In other words, a density of an output image can be brought closer to a target density by converting tone values indicated by image data using the base table 725 and performing image formation with the converted tone values. Density control information is one of the image forming conditions related to density.

After generating the base table 725, the control unit 403 determines in step S15 whether the values of the environmental information (environmental conditions) detected by the environment detection unit 409 are within allowable ranges. The allowable ranges can be set individually for each of temperature and humidity. That is, in step S15, if both the temperature and humidity detected by the environment detection unit 409 are within respectively set allowable ranges, the control unit 403 determines that the values of the environmental information are within allowable ranges. (If both the temperature and humidity detected by the environment detection unit 409 are within respectively set allowable ranges, the control unit 403 determines that the environmental conditions satisfy predetermined conditions.) A configuration in which it is determined in step S15 whether only the temperature is within the allowable range may be taken, or a configuration in which it is determined in step S15 whether only the humidity is within the allowable range may be taken. In the configuration in which determination is made using only the temperature, if the temperature is within the allowable range, the control unit 403 determines that the environmental condition satisfies the predetermined condition. In the configuration in which determination is made using only the humidity, if the humidity is within the allowable range, the control unit 403 determines that the environmental condition satisfies the predetermined condition. The allowable ranges can be determined based on the ranges of values of environmental information used for generating the learning model used by the prediction processing unit 405. For example, a range from the minimum value to the maximum value of temperature used for generating the learning model used by the prediction processing unit 405 may be an allowable range for temperature. Alternatively, for example, a range from a value obtained by adding a first predetermined value to the minimum value of temperature used for generating the learning model used by the prediction processing unit 405 to a value obtained by adding a second predetermined value to the maximum value can be set as the allowable range for temperature. The first predetermined value and the second predetermined value may be a positive value or a negative value, and the signs of the first predetermined value and the second predetermined value may be the same as or different from each other. It is similar for the allowable range for humidity. The allowable ranges may be, for example, determined by the machine learning server 102 and obtained from the machine learning server 102 together with the learning model. Alternatively, the control unit 403 may obtain ranges of values of the environmental information used for generating the learning model together with the learning model from the machine learning server 102 and determine the allowable ranges based on the ranges of the values. If the values of the environmental information are within the allowable ranges, the control unit 403 sets a permission flag to 1 in step S16, and otherwise, the control unit 403 sets the permission flag to 0 in step S17.

In step S15, the values (determination values) of the environmental information (temperature and humidity) for which determination as to whether it is within the allowable range may be, for example, values that the environment detection unit 409 detected at a timing at which the processing of step S15 is executed. Alternatively, the determination values in step S15 may be, for example, a plurality of values detected by the environment detection unit 409 during main calibration or values based on the plurality of values. Alternatively, the determination values in step S15 may be a plurality of values detected by the environment detection unit 409 within a predetermined period of time in the past from a timing at which the processing of step S15 is executed or a timing at which main calibration is started, or values based on the plurality of values. In the case where a plurality of values are used as the determination values, the permission flag is set to 1 when all of the plurality of values are within the acceptable ranges, and the permission flag is set to 0 otherwise. The value based on the plurality of values is a statistical value based on the plurality of values such as the average value of the plurality of values.

Once the base table 725 is created by execution of the processing of FIG. 6, the control unit 403 forms an image using the base table 725 until execution of intermediate tone calibration or predictive calibration to be described below. In other words, tone values indicated by image data are converted using the base table 725 and an output image is formed based on the converted tone values. Thus, a density of the output image can be brought closer to a tone value indicated by image data. However, the difference between a density of an output image and a target density may increase when the reference density characteristic 1803 changes due to an environmental change or temporal change. If an execution frequency of main calibration is increased to reduce the change in density of an output image, the downtime increases. For this reason, in the present embodiment, intermediate tone calibration or predictive calibration is performed to generate the modification table 726. Once the modification table 726 is generated, the control unit 403 converts tone values indicated by image data further using the modification table 726 at the time of image formation.

<Intermediate Tone Calibration/Predictive Calibration>

The intermediate tone calibration and the predictive calibration each are started when a predetermined execution condition is satisfied. In the present embodiment, the execution conditions for the two calibrations are set so that an execution frequency of predictive calibration, which does not need actual formation of a tone pattern, will be greater than an execution frequency of intermediate tone calibration. For example, the execution conditions may be conditions based on the number of sheets S on which an image has been formed in a print job. In this case, the number of sheets at which it is determined to execute predictive calibration may be smaller than the number of sheet at which it is determined to execute intermediate tone calibration. Furthermore, the execution conditions for predictive calibration and intermediate tone calibration may be conditions based on a change in environmental information or conditions based on a change in the state of the image forming apparatus 100, such as when the power of the image forming apparatus 100 is turned on or when it recovers from sleep mode.

FIG. 8 is a flowchart of processing related to calibration that is performed by the control unit 403 during image formation based on a print job. The control unit 403 initializes a value N of the number of formed sheets to 1 in step S20 and forms an image on an N-th sheet S in step S21. In step S22, the control unit 403 determines whether a first condition, which is the execution condition for predictive calibration, is satisfied. The first condition may be a condition based on the value of N. If the first condition is satisfied, the control unit 403 determines in step S24 whether the permission flag is 1. If the permission flag is not 1, the control unit 403 advances the processing to step S26. Meanwhile, if the permission flag is 1, the control unit 403 executes in step S28 the predictive calibration to be described later. After executing the predictive calibration, the control unit 403 advances the processing to step S26. Thus, in the present embodiment, if the permission flag is not 1, the execution of the predictive calibration will be inhibited even if the first condition is satisfied. In other words, if the values of the environmental information detected by the image forming apparatus 100 are out of the allowable ranges based on the values of the environmental information used for generating the learning model, execution of the predictive calibration will be inhibited.

Meanwhile, if the first condition is not satisfied in step S22, the control unit 403 determines in step S23 whether a second condition, which is the execution condition for intermediate tone calibration, is satisfied. The second condition may be a condition based on the value of N. Meanwhile, if the second condition is satisfied, the control unit 403 executes in step S25 the intermediate tone calibration to be described later. After executing the intermediate tone calibration, the control unit 403 advances the processing to step S26. If the second condition is not satisfied in step S23, the control unit 403 advances the processing to step S26. In step S26, the control unit 403 determines whether printing has been completed, that is, whether all of the images in the print job have been formed; if printing has been completed, the control unit 403 ends the processing of FIG. 8. Meanwhile, if printing has not been completed, the control unit 403 increments N by 1 in step S27 and repeats the processing from step S21.

<Intermediate Tone Calibration>

FIG. 9 is a flowchart of intermediate tone calibration performed in step S25 of FIG. 8. In step S30, the control unit 403 forms a second tone pattern of each color on the intermediate transfer body 205. The second tone pattern includes images of a plurality of different densities formed by a plurality of different tone values. As an example, the second tone pattern includes 10 images of different densities. In step S31, the control unit 403 obtains, from the density detection unit 408, the density of each image of the second tone pattern detected by the density sensor 716. In step S32, the control unit 403 generates the modification table 726 based on the density of each image of the second tone pattern detected by the density sensor 716 and a tone value used for forming each image of the second tone pattern and stores the modification table 726 in the storage unit 401.

FIG. 7B is a diagram for explaining a method of generating the modification table 726. The open circles of FIG. 7B indicate the tone values used for forming the images of the second tone table and the densities determined in step S31 for the images formed using the tone values. A reference numeral 1804 of FIG. 7B indicates a current density characteristic of the image forming apparatus 100 that is determined from the tone values used for forming the second tone table and the densities determined in step S31. The modification table 726 is information for bringing the current density characteristic 1804 (also referred to as tone characteristic) closer to the reference density characteristic 1803 (also referred to as ideal tone characteristic) obtained by main calibration.

Specifically, the control unit 403 creates the modification table 726 by inversely converting the current density characteristic 1804 with respect to the reference density characteristic 1803.

The modification table 726 is information (conversion condition) for converting inputted image data (tone values) and is also density control information (image forming condition) for bringing a density of an output image closer to a target density. The control unit 403 converts tone values indicated by image data using the modification table 726, further converts the tone values converted using the modification table 726 using the base table 725, and performs image formation with the tone values converted using the base table 725. Alternatively, the control unit 403 creates a combined table in which the modification table 726 and the base table 725 are combined, stores the combined table in the storage unit 401, converts tone values indicated by image data using the combined table, and performs image formation using the tone values converted using the combined table. In this case, the combined table is information (conversion condition) for converting inputted image data (tone values).

The combined table based on the modification table 726 or the modification table 726 generated by intermediate tone calibration is used until the intermediate tone calibration or the predictive calibration is performed next and the modification table 726 is updated. Once main calibration is performed, the modification table 726 can be deleted, for example.

<Predictive Calibration>

FIG. 10 is a flowchart of predictive calibration performed in step S28 of FIG. 8. In step S40, the control unit 403 obtains, from the prediction processing unit 405, a result of prediction of the densities of images to be formed at respective tone values. In the present embodiment, the prediction processing unit 405 predicts the densities of images to be formed on the intermediate transfer body 205. In step S41, the control unit 403 creates the modification table 726 based on the densities predicted by the prediction processing unit 405 in step S40. The method of creating the modification table 726 based on predicted densities is similar to the method of creating the modification table 726 in intermediate tone calibration, except for the difference as to whether densities are predicted or measured. That is, the difference from the intermediate tone calibration is only in that the current density characteristic 1804 of FIG. 7B is not determined based on the result of detection of the second tone pattern but is determined based on the result of prediction by the prediction processing unit 405.

The combined table based on the modification table 726 or the modification table 726 generated by predictive calibration is used until the intermediate tone calibration or the predictive calibration is performed next and the modification table 726 is updated. Once main calibration is performed, the modification table 726 can be deleted, for example.

A configuration may be taken so as to, in predictive calibration, predict densities for each timing in the future and create the modification table 726 for each timing. For example, the prediction processing unit 405 sets a timing at which to perform prediction processing to t=0 and predicts a relationship between a tone value and a density of an output image at respective timings, t=0, t1, t2. . . . In this case, the control unit 403 can generate the modification table 726 for each timing, t=0, t1, t2. . . . The modification table 726 for t=0 is used for t=0 to t1. The modification table 726 for t=1 is used for t=1 to t2. When intermediate tone calibration or predictive calibration is executed next, the modification tables 726 generated by the previous predictive calibration or the combined table based on these modification tables 726 are deleted.

In the present embodiment, determination as to whether to execute predictive calibration is made based on the values of environmental information. However, the present invention is not limited to a configuration in which determination as to whether to execute predictive calibration is made based on the values of environmental information. Specifically, one or more parameters among a plurality of parameters used as input to the learning model are set as determination target parameters. Then, an allowable range is set for each of the one or more determination target parameters. The allowable range to be set for the determination target parameter is set based on the range of values of the determination target parameter used for generating the learning model. For example, the allowable range to be set for the determination target parameter may be the same as the range of values of the determination target parameter used for generating the learning model. Then, a configuration may be taken so as to, if all of the one or more determination target parameters are within respectively set allowable ranges, determine to execute predictive calibration and, otherwise, determine to not execute predictive calibration.

Furthermore, in the present embodiment, the permission flag is set during execution of main calibration. In other words, determination as to whether to execute predictive calibration is made in the main calibration. However, the present invention is not limited to a configuration in which determination as to whether to execute predictive calibration is made in the main calibration. A determination timing at which determination as to whether to execute predictive calibration is made may be, for example, a timing at which the first condition is satisfied or a timing at which a print job is received. By shortening the time difference between the determination timing and the timing at which the execution condition for predictive calibration could be satisfied, it is possible to reduce unnecessary prevention of execution of predictive calibration. The determination timing may be a timing at which the power of the image forming apparatus 100 is turned on, a timing at which the image forming apparatus 100 recovers from a sleep state, or a timing at which at least one of the values of determination target parameters changes by a threshold set for the determination target parameters or more. By setting the timing at which a value of a determination target parameter may have changed greatly as the determination timing, it is possible to prevent generation of a low accuracy modification table 726 based on low prediction accuracy. A configuration in which the control unit 403 sets, as a determination value, a value of a determination target parameter at the determination timing, a plurality of values of the determination target parameter within a predetermined period of time in the past from the determination timing, or a value based on the plurality of values and determines whether to perform predictive calibration based on whether the determination value is within the allowable range may be taken.

As described above, when at least one of the one or more determination target parameters used for density prediction is outside the allowable range determined based on the values used for generating the learning model, execution of the predictive calibration is inhibited. With this configuration, it is possible to prevent generation of a low accuracy modification table 726 based on low prediction accuracy. Therefore, it is possible to reduce deviation of a density of an output image from a target density caused by the low accuracy modification table 726. In other words, it is possible to prevent a decrease in calibration accuracy.

Furthermore, in the present embodiment, determination as to whether to execute predictive calibration is made collectively for all the colors; however, a configuration in which determination is made individually for each color may be taken. For example, a configuration in which if the permission flag of yellow is 1 and the permission flag of another color is 0, when the first condition is satisfied, only the predictive calibration for yellow is performed in step S28 of FIG. 8 may be taken.

In the embodiment, the reference density characteristic 1803 indicates a relationship between the tone value and the density of each image of the first tone pattern formed on a sheet. However, since a density at the intermediate transfer body 205 is measured in the intermediate tone calibration and a density at the intermediate transfer body 205 is predicted in the predictive calibration, the reference density characteristic 1803 may be made to indicate a relationship between the tone value and the density of each image of the first tone pattern formed on the intermediate transfer body 205. In this case, in the main calibration, the control unit 403 obtains the density of each image of the first tone pattern formed on the intermediate transfer body 205 from the density detection unit 408. In the embodiment, a density of an image at the intermediate transfer body 205 is predicted in the predictive calibration; however, a configuration in which a density of an image formed on a sheet is predicted may be taken. Furthermore, although the embodiment has been described using an electrophotographic image forming apparatus as an example, the present invention is also applicable to inkjet, sublimation, and other image forming apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-020972, filed Feb. 14, 2023, which is hereby incorporated by reference herein in its entirety.

What is claimed is:

1. An image forming apparatus comprising:
an image forming unit configured to form an image on a sheet based on an image forming condition;
an image carrier;
a sensor configured to measure a measurement image on the image carrier formed by the image forming unit;
a prediction unit configured to predict a density of an image to be formed by the image forming unit;
a detector configured to detect an environmental condition; and
a controller configured to:
control whether to execute first calibration, in which the measurement image is not formed and the image forming condition is controlled based on the density predicted by the prediction unit, based on the environmental condition detected by the detector; and
execute second calibration, in which the image forming condition is controlled based on a measurement result of the measurement image measured by the sensor.

2. The image forming apparatus according to claim 1, wherein
the controller is further configured
to execute the first calibration if the environmental condition detected by the detector satisfies a predetermined condition, and
not to execute the first calibration if the environmental condition detected by the detector does not satisfy the predetermined condition.

3. The image forming apparatus according to claim 2, wherein
the environmental condition includes temperature.

4. The image forming apparatus according to claim 2, wherein
the environmental condition includes humidity.

5. The image forming apparatus according to claim 2, wherein
the environmental condition includes temperature and humidity.

6. The image forming apparatus according to claim 1, further comprising a reader configured to read a test image on a sheet, wherein
the image forming unit forms the test image on a sheet,
the controller generates the image forming condition based on a reading result of the test image read by the reader, and
in a case where the image forming condition is generated based on the reading result of the test image, the controller controls the detector so as to detect the environmental condition.

7. The image forming apparatus according to claim 1, wherein
each time the image forming unit forms images on sheets of a first number, the controller controls the detector so as to detect the environmental condition.

8. The image forming apparatus according to claim 7, wherein
each time the image forming unit forms images on sheets of a second number which is greater than the first number, the controller controls the image forming unit so as to form the measurement image.

9. The image forming apparatus according to claim 1, wherein
each time the image forming unit forms images on sheets of a first number, the controller controls whether to execute the first calibration based on the environmental condition detected by the detector, and
each time the image forming unit forms images on sheets of a second number which is greater than the first number, the controller executes the second calibration.

10. The image forming apparatus according to claim 1, wherein
the prediction unit predicts a density of an image on the image carrier to be formed by the image forming unit.

11. The image forming apparatus according to claim 1, wherein
the image forming condition is a conversion condition for converting image data to be input, and
the image forming unit forms the image on the sheet based on the converted image data.

12. The image forming apparatus according to claim 11, wherein
the conversion condition is a tone correction table for correcting a tone characteristic.

* * * * *